(12) United States Patent
Crowl

(10) Patent No.: US 6,196,121 B1
(45) Date of Patent: Mar. 6, 2001

(54) HAND-HELD COOKING UTENSIL

(76) Inventor: Terry G. Crowl, Rte. #3 Box #260-B, Weston, WV (US) 26452

( * ) Notice: Subject to any disclaimer, the term of this patent is extended or adjusted under 35 U.S.C. 154(b) by 0 days.

(21) Appl. No.: 09/612,109

(22) Filed: Jul. 7, 2000

(51) Int. Cl.[7] .............................. A47J 37/04; A47J 43/18; A47J 43/28
(52) U.S. Cl. ........................... 99/421 A; 99/394; 99/419; 99/427; 99/441
(58) Field of Search .............................. 99/339, 340, 394, 99/419–421 V, 426, 427, 447–450, 440, 441, 442; 30/321–323, 123, 129, 137; 248/124.2; 294/33, 61, 100, 99.1, 49, 50; D7/686, 357, 328, 683

(56) References Cited

U.S. PATENT DOCUMENTS

| | | | |
|---|---|---|---|
| 489,056 | * | 1/1893 | Westheimer ............................. 99/394 |
| 2,041,369 | * | 5/1936 | Pickett ................................ 99/421 A |
| 2,317,388 | * | 4/1943 | Lako, Jr. ................................ 99/419 |
| 2,479,324 | * | 8/1949 | Dawson ................................. 99/419 |
| 2,479,533 | * | 8/1949 | Woodbury .............................. 99/419 |
| 2,594,500 | * | 4/1952 | Runnoe ................................. 99/394 |
| 2,706,446 | * | 4/1955 | Lockey ................................. 99/419 |
| 3,433,151 | * | 3/1969 | Farran et al. ....................... 99/394 X |
| 3,745,910 | * | 7/1973 | Delamater .............................. 99/419 |
| 4,569,278 | * | 2/1986 | Reynolds ............................... 99/394 |
| 5,355,778 | * | 10/1994 | Mayfield et al. ....................... 99/441 |
| 5,628,244 | * | 5/1997 | Holliday ............................. 99/441 X |
| 5,775,207 | * | 7/1998 | Warren ............................. D7/686 X |

* cited by examiner

*Primary Examiner*—Timothy F. Simone

(57) ABSTRACT

A hand-held cooking utensil for safely holding and rotating food items when cooking upon an open fire. The hand-held cooking utensil includes a handle member including a housing having an open first end and a second end having an opening therethrough and further includes a protective heat shield member securely attached to the second end of the housing and also including an end cap member being removably attached to the housing for closing the open first end thereof; and also includes an elongate support member having a first end and a second end and being rotatably attached to the handle member; and further includes a coupler through which the first end of the elongate support member is journaled; and also includes prongs being spaced apart and each having a first end which is securely attached to the second end of the elongate support member with the prongs extending outwardly parallel to the elongate support member; and further includes a rotation assembly for rotating the elongate support member; and also includes a storage assembly for storing the elongate support member.

9 Claims, 2 Drawing Sheets

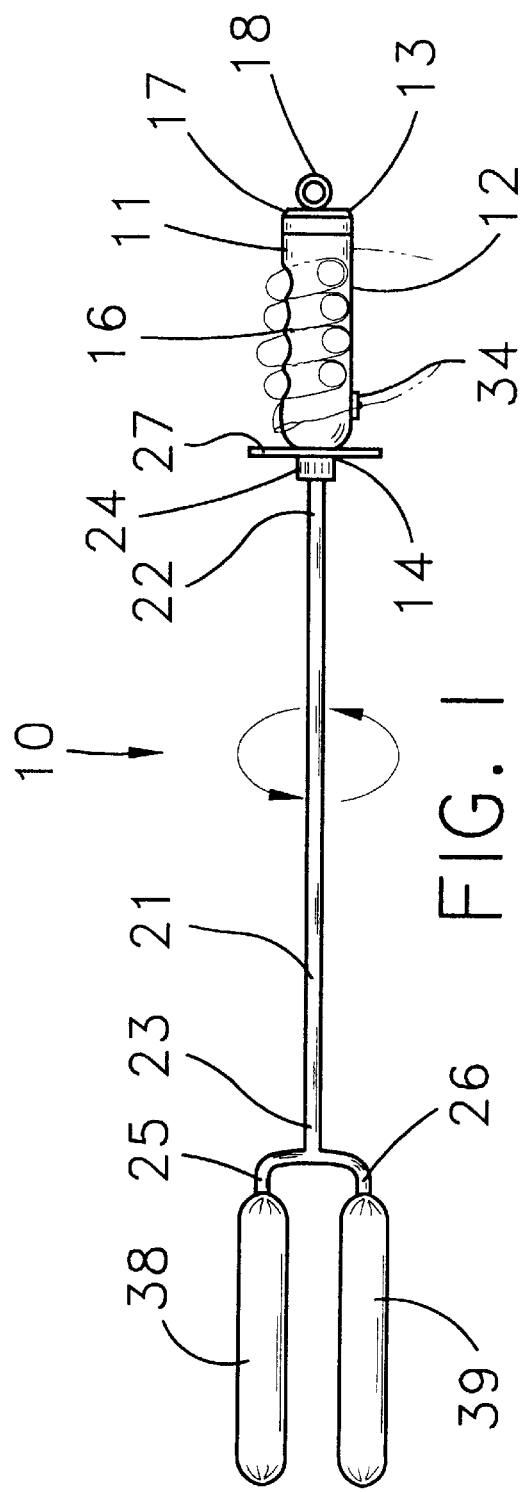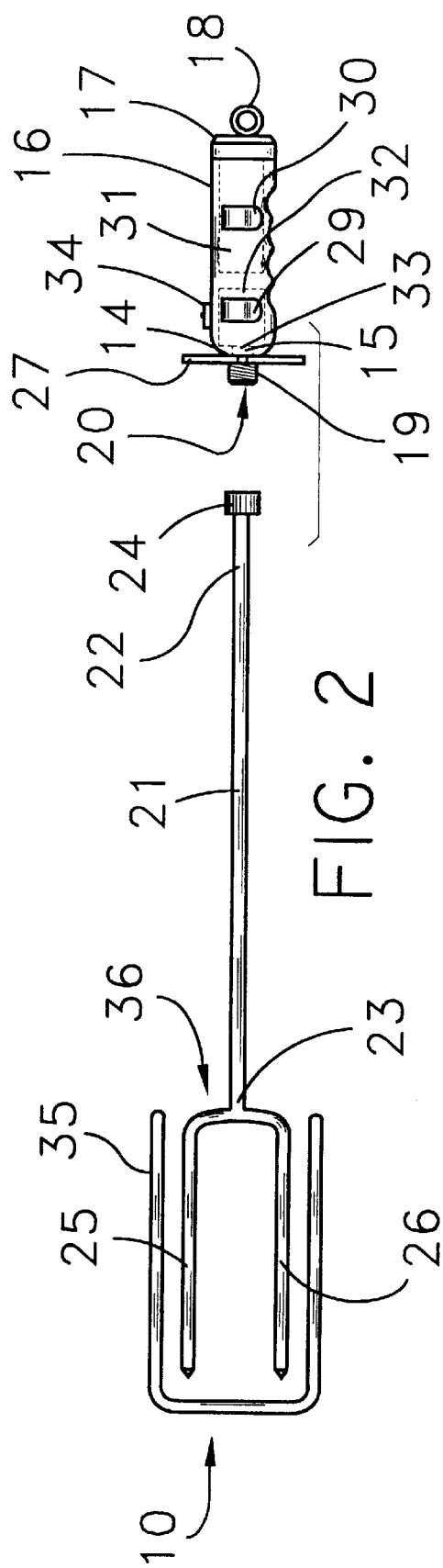

HAND-HELD COOKING UTENSIL

BACKGROUND OF THE INVENTION

1. Field of the Invention

The present invention relates to a rotatable roasting rod and more particularly pertains to a new hand-held cooking utensil for safely holding and rotating food items when cooking upon an open fire.

2. Description of the Prior Art

The use of a rotatable roasting rod is known in the prior art. More specifically, a rotatable roasting rod heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,827,848; 4,815,367; 4,896,253; U.S. Pat. No. Des. 258,940; U.S. Pats. No. 4,539,751; and 4,332,409.

While these devices fulfill their respective, particular objectives and requirements, the aforementioned patents do not disclose a new hand-held cooking utensil. The inventive device includes a handle member including a housing having an open first end and a second end having an opening therethrough and further includes a protective heat shield member securely attached to the second end of the housing and also including an end cap member being removably attached to the housing for closing the open first end thereof; and also includes an elongate support member having a first end and a second end and being rotatably attached to the handle member; and further includes a coupler through which said first end of said elongate support member is journaled; and also includes prongs being spaced apart and each having a first end which is securely attached to the second end of the elongate support member with the prongs extending outwardly parallel to the elongate support member; and further includes a rotation assembly for rotating the elongate support member; and also includes a storage assembly for storing the elongate support member.

In these respects, the hand-held cooking utensil according to the present invention substantially departs from the conventional concepts and designs of the prior art, and in so doing provides an apparatus primarily developed for the purpose of safely holding and rotating food items when cooking upon an open fire.

SUMMARY OF THE INVENTION

In view of the foregoing disadvantages inherent in the known types of rotatable roasting rods now present in the prior art, the present invention provides a new hand-held cooking utensil construction wherein the same can be utilized for safely holding and rotating food items when cooking upon an open fire.

The general purpose of the present invention, which will be described subsequently in greater detail, is to provide a new hand-held cooking utensil which has many of the advantages of the rotatable roasting rod mentioned heretofore and many novel features that result in a new hand-held cooking utensil which is not anticipated, rendered obvious, suggested, or even implied by any of the prior art rotatable roasting rod, either alone or in any combination thereof.

To attain this, the present invention generally comprises a handle member including a housing having an open first end and a second end having an opening therethrough and further includes a protective heat shield member securely attached to the second end of the housing and also including an end cap member being removably attached to the housing for closing the open first end thereof; and also includes an elongate support member having a first end and a second end and being rotatably attached to the handle member; and further includes a coupler through which said first end of said elongate support member is journaled; and also includes prongs being spaced apart and each having a first end which is securely attached to the second end of the elongate support member with the prongs extending outwardly parallel to the elongate support member; and further includes a rotation assembly for rotating the elongate support member; and also includes a storage assembly for storing the elongate support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand-held cooking utensil which has many of the advantages of the rotatable roasting rod mentioned heretofore and many novel features that result in a new hand-held cooking utensil which is not anticipated, rendered obvious, suggested, or even implied by any of the prior art rotatable roasting rod, either alone or in any combination thereof.

It is another object of the present invention to provide a new hand-held cooking utensil which may be easily and efficiently manufactured and marketed.

It is a further object of the present invention to provide a new hand-held cooking utensil which is of a durable and reliable construction.

An even further object of the present invention is to provide a new hand-held cooking utensil which is susceptible of a low cost of manufacture with regard to both materials and labor, and which accordingly is then susceptible of low prices of sale to the consuming public, thereby making such hand-held cooking utensil economically available to the buying public.

Still yet another object of the present invention is to provide a new hand-held cooking utensil which provides in the apparatuses and methods of the prior art some of the advantages thereof, while simultaneously overcoming some of the disadvantages normally associated therewith.

Still another object of the present invention is to provide a new hand-held cooking utensil for safely holding and rotating food items when cooking upon an open fire.

Yet another object of the present invention is to provide a new hand-held cooking utensil which includes a handle member including a housing having an open first end and a second end having an opening therethrough and further includes a protective heat shield member securely attached to the second end of the housing and also including an end cap member being removably attached to the housing for closing the open first end thereof; and also includes an elongate support member having a first end and a second end and being rotatably attached to the handle member; and further includes a coupler through which said first end of said elongate support member is journaled; and also includes prongs being spaced apart and each having a first end which is securely attached to the second end of the elongate support member with the prongs extending outwardly parallel to the elongate support member; and further includes a rotation assembly for rotating the elongate support member; and also includes a storage assembly for storing the elongate support member.

Still yet another object of the present invention is to provide a new hand-held cooking utensil that prevents the user from getting burned while cooking one's food on an open fire.

Even still another object of the present invention is to provide a new hand-held cooking utensil that prevents the food items from falling off while the elongate support member is rotating.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a first side elevational view of a new hand-held cooking utensil according to the present invention.

FIG. 2 is a second side elevational view of the present invention.

DESCRIPTION OF THE PREFERRED EMBODIMENT

Figure 3:
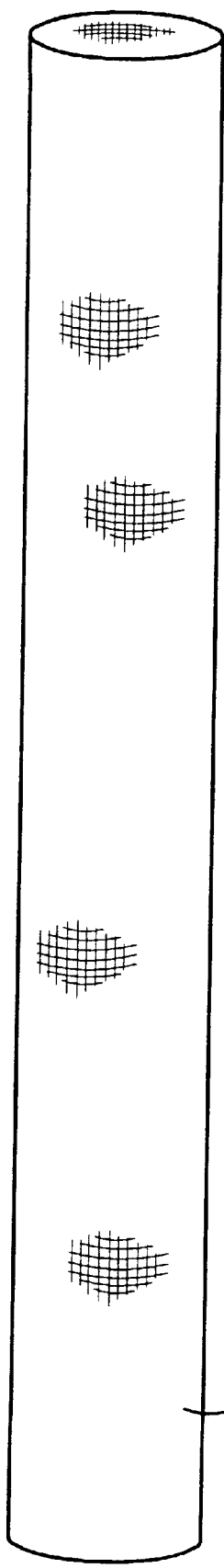
FIG. 3 is a side elevational view of the storage bag of the present invention.
Figure 4:
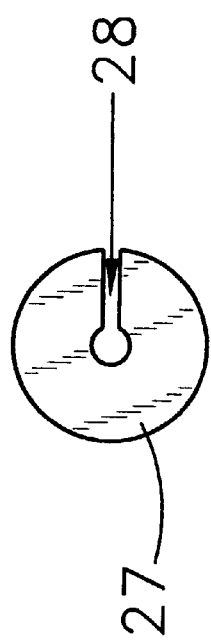
FIG. 4 is face one elevational view of the protective heat shield member.

With reference now to the drawings, and in particular to FIGS. 1 through 4 thereof, a new hand-held cooking utensil embodying the principles and concepts of the present invention and generally designated by the reference numeral 10 will be described.

As best illustrated in FIGS. 1 through 4, the hand-held cooking utensil 10 generally comprises a handle member 11 including a housing 12 having an open first end 13 and a second end 14 having an opening 15 extending therethrough and further including a protective heat shield member 27 securely and conventionally attached to the second end 14 of the housing 12 and also including an end cap member 17 being removably attached to the housing 12 for closing the open first end 13 thereof. The handle member 11 further includes a boss-like member 19 having a bore 20 extending therethrough and being securely and conventionally attached to and extending from the second end 14 of the housing 12. The bore 20 of the boss-like member 19 is in alignment with the opening 15 extending through the second end 14 of the housing 12. The end cap member 17 has an eyelet 18 securely and conventionally attached thereto and extending therefrom for hanging and storing the hand-held cooking utensil 10.

The hand-held cooking utensil 10 also comprises an elongate support member 21 having a first end 22 and a second end 23 and being rotatably attached to the handle member 11 with a coupler 24 through which the first end 22 of the elongate support member 21 is journaled. The coupler 24 is threaded upon the boss-like member 24 with the first end 22 of the elongate support member 21 being rotatably extended into the bore 20 of the boss-like member 19.

The hand-held cooking utensil 10 further comprises prongs 25,26 being spaced apart and each having a first end which is securely and conventionally attached and welded to the second end 23 of the elongate support member 21 with the prongs 25,26 extending outwardly parallel to the elongate support member 21.

Means for rotating the elongate support member 21 includes a motor 32 being securely and conventionally disposed inside the housing 12 and having a motor shaft 33 being conventionally connected to the first end 22 of the elongate support member 21, and also includes a battery 31 being removably disposed inside the housing 12 through the open first end 13 thereof, and further includes an on/off switch 34 movably and conventionally disposed upon a wall 16 of the housing 12 and being connected to the battery 31 and to the motor 32 for energizing the motor 32.

Means for storing the elongate support member 21 includes the protective heat shield member 27 being essentially a ring-like member having a slot 28 extending radially inwardly through a circumference thereof, and also including clip members 29,30 being hingedly attached to the wall 16 of the housing 12 and being in alignment with the slot 28 of the protective heat shield member 27. The slot 28 is adapted to receive a portion of the elongate support member 21, and the clip members 29,30 are adapted to clamp about a portion of the elongate support member 21 for the storing thereof. A protective cover 35 is used to cover the prongs 25,26 with the protective cover 35 being essentially cylindrically-shaped and having an open end 36 through which the prongs 25,26 are extendable. A storage bag 37 is essentially used for storing the hand-held cooking utensil 10.

In use, the user extends the prongs 25,26 into the food items 38,39 such as hot dogs and instead of the user having to rotate the elongate support member 21 and the prongs 25,26, the user turns on the switch 34 which energizes the motor 32 which, in turn, rotates the elongate support member 21 and the prongs 25,26 so that the food items 38,39 are evenly cooked.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand-held cooking utensil comprising:
   a handle member including a housing having an open first end and a second end having an opening therethrough and further including a protective heat shield member securely attached to said second end of said housing and also including an end cap member being removably attached to said housing for closing said open first end thereof;
   an elongate support member having a first end and a second end and being rotatably attached to said handle member;
   a coupler through which said first end of said elongate support member is journaled;
   prongs being spaced apart and each having a first end which is securely attached to said second end of said elongate support member, said prongs extending outwardly parallel to said elongate support member;
   means for rotating said elongate support member; and
   means for storing said elongate support member.

2. A hand-held cooking utensil as described in claim 1, wherein said handle member further includes a boss-like member having a bore extending therethrough and being securely attached to and extending from said second end of said housing, said bore of said boss-like member being in alignment with said opening extending through said second end of said housing.

3. A hand-held cooking utensil as described in claim 2, wherein said coupler is threaded upon said boss-like member with said first end of said elongate support member being rotatably extend into said bore of said boss-like member.

4. A hand-held cooking utensil as described in claim 3, wherein said means for rotating said elongate support member includes a motor being securely disposed inside said housing and having a motor shaft being connected to said first end of said elongate support member, and also includes a battery being removably disposed inside said housing through said open first end thereof, and further includes an on/off switch movably disposed upon a wall of said housing and being connected to said battery and to said motor for energizing said motor.

5. A hand-held cooking utensil as described in claim 4, wherein said means for storing said elongate support member includes said protective heat shield member being essentially a disc-like member having a slot extending radially inwardly through a circumference thereof, and also includes clip members being hingedly attached to said wall of said housing and being in alignment with said slot of said protective heat shield member, said slot being adapted to receive a portion of said elongate support member, and said clip members being adapted to clamp about a portion of said elongate support member for the storing thereof.

6. A hand-held cooking utensil as described in claim 5, wherein said end cap member has an eyelet securely attached thereto and extending therefrom for hanging and storing said hand-held cooking utensil.

7. A hand-held cooking utensil as described in claim 6, further includes a protective cover for said prongs, said protective cover being essentially cylindrically-shaped and having an open end through which said prongs are extendable.

8. A hand-held cooking utensil as described in claim 7, also includes a storage bag for storing said hand-held cooking utensil.

9. A hand-held cooking utensil comprising:
   a handle member including a housing having an open first end and a second end having an opening therethrough and further including a protective heat shield member securely attached to said second end of said housing and also including an end cap member being removably attached to said housing for closing said open first end thereof, said handle member further including a boss-like member having a bore extending therethrough and being securely attached to and extending from said second end of said housing, said bore of said boss-like member being in alignment with said opening extending through said second end of said housing, said end cap member having an eyelet securely attached thereto and extending therefrom for hanging and storing said hand-held cooking utensil;
   an elongate support member having a first end and a second end and being rotatably attached to said handle member;
   a coupler through which said first end of said elongate support member is journaled, said coupler being threaded upon said boss-like member with said first end of said elongate support member being rotatably extend into said bore of said boss-like member;
   prongs being spaced apart and each having a first end which is securely attached to said second end of said elongate support member, said prongs extending outwardly parallel to said elongate support member;
   means for rotating said elongate support member including a motor being securely disposed inside said housing and having a motor shaft being connected to said first end of said elongate support member, and also including a battery being removably disposed inside said housing through said open first end thereof, and further including an on/off switch movably disposed upon a wall of said housing and being connected to said battery and to said motor for energizing said motor;
   means for storing said elongate support member including said protective heat shield member being essentially a disc-like member having a slot extending radially inwardly through a circumference thereof, and also including clip members being hingedly attached to said wall of said housing and being in alignment with said slot of said protective heat shield member, said slot being adapted to receive a portion of said elongate support member, and said clip members being adapted to clamp about a portion of said elongate support member for the storing thereof;
   a protective cover for said prongs, said protective cover being essentially cylindrically-shaped and having an open end through which said prongs are extendable; and
   a storage bag for storing said hand-held cooking utensil.

* * * * *